United States Patent [19]

Bennett et al.

[11] 3,891,939

[45] June 24, 1975

[54] VARIABLE FREQUENCY PULSE TRAIN GENERATOR

[75] Inventors: David B. Bennett, Minneapolis; Charles P. Harman, Roseville, both of Minn.

[73] Assignee: Honeywell, Inc., Minneapolis, Minn.

[22] Filed: Feb. 4, 1974

[21] Appl. No.: 439,200

[52] U.S. Cl. .................. 331/1 A; 307/271; 328/207; 331/144; 331/179

[51] Int. Cl. .................. H03b 3/04

[58] Field of Search ........ 331/113 R, 144, 145, 1 A, 331/179; 328/207; 307/271

[56] References Cited

UNITED STATES PATENTS

| | | | |
|---|---|---|---|
| 3,015,694 | 1/1962 | David | 178/50 |
| 3,209,174 | 9/1965 | Cole | 307/271 |
| 3,249,893 | 5/1966 | Castellano, Jr. | 331/113 |
| 3,293,569 | 12/1966 | Englund, Jr. et al. | 331/145 |
| 3,325,721 | 6/1967 | Clark | 321/60 |
| 3,358,083 | 12/1967 | Helm | 325/38 |
| 3,418,586 | 12/1968 | Asher | 329/104 |
| 3,441,872 | 4/1969 | Wagener et al | 328/207 |
| 3,543,295 | 11/1970 | Overstreet, Jr. | 328/38 |
| 3,562,559 | 2/1971 | Rapp | 331/113 |
| 3,632,888 | 1/1972 | Glaser | 178/50 |
| 3,691,471 | 9/1972 | Cicognani | 307/271 |
| 3,729,688 | 4/1973 | Cerny, Jr. et al. | 331/1 |

*Primary Examiner*—John Kominski
*Attorney, Agent, or Firm*—Charles J. Ungemach; Albin Medved

[57] ABSTRACT

A circuit for providing a train of high frequency digital pulses containing a predetermined number of pulses at each of a number of predetermined frequencies. An astable free-running multivibrator is constructed by interconnection of two monostable multivibrators the frequency of which is controlled by varying the resistive component of their R-C timing networks. Control circuitry is also provided to count the number of pulses of each frequency generated at the output of the free-running multivibrator and to switch resistors of predetermined valve into the R-C timing networks of the two monostable multivibrators, to thereby control the frequency of said multivibrators.

6 Claims, 2 Drawing Figures

VARIABLE FREQUENCY PULSE TRAIN GENERATOR

BACKGROUND OF THE INVENTION

1. Field of the Invention

The invention relates generally to variable frequency signal generators and more specifically to circuitry for generating high frequency digital pulses at a number of precisely determined unrelated frequencies. The specific use of this invention is intended for aircraft collision warning systems of the type disclosed in U.S. Pat. No. 3,714,648, although clearly the invention has other applications.

2. Description of the Prior Art

The prior art circuits generally use either a fixed frequency generator or an external generator to supply the pulses which in turn are modified. The frequencies generated by such prior art circuits are therefore closely related to the basic frequency, usually being either some integer multiple or simple fraction multiple of the basic frequency. To vary the frequency by other than integer or simple fraction multiples, the prior art found it necessary to employ very complex gating circuitry such as shown in U.S. Pat. No. 3,691,471, which would be impractical for the purposes of the present invention.

SUMMARY OF THE INVENTION

The invention comprises circuitry which includes a pair of monostable multivibrators connected back-to-back to generate the frequency. The frequency is varied by altering the basic circuitry through a switching arrangement, whereby resistors of different value are switched into the R-C timing networks of the two monostable multivibrators. Thus, the basic frequency of the generator is altered electronically. Additionally, the present invention provides a means for varying the number of pulses generated at each of the selected frequencies by providing control circuitry for counting the number of pulses of each of the frequencies produced at the generator output and controlling the frequency of the generator in response to the count.

A significant advantage of the present invention is that the frequencies generated are completely independent of each other. For example, one frequency could be at 1.1 MHz, another at 1.3 MHz, a third at 0.97 MHz, etc.

Another advantage of the present invention is that, rather than operating on pulses of a basic frequency, the frequencies are changed by electronically altering the basic generator.

Thirdly, the present circuitry provides means for generating a different number of pulses at each of the frequencies selected.

DESCRIPTION AND OPERATION

Figure 1:
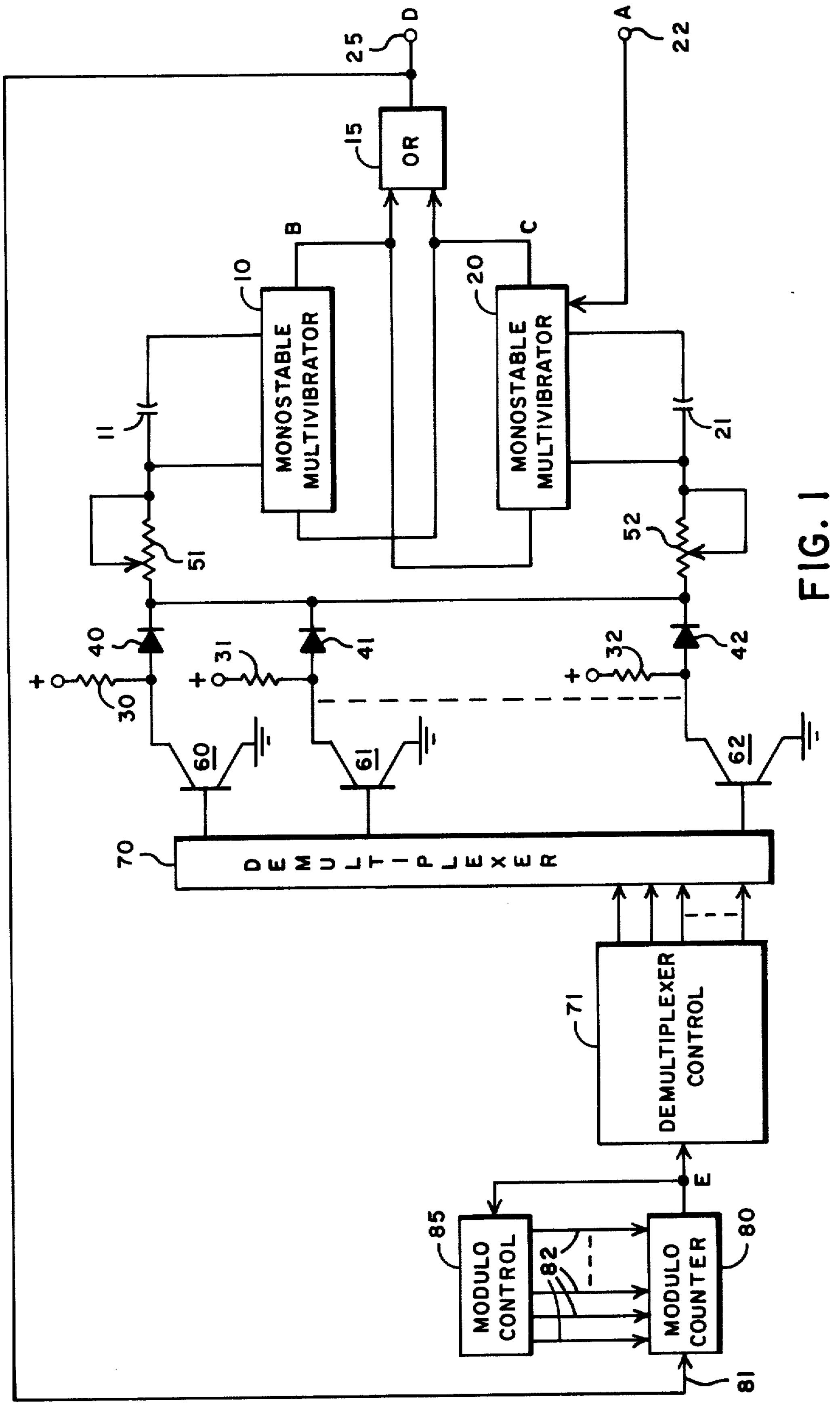
FIG. 1 illustrates a preferred embodiment of the present invention.
Figure 2:
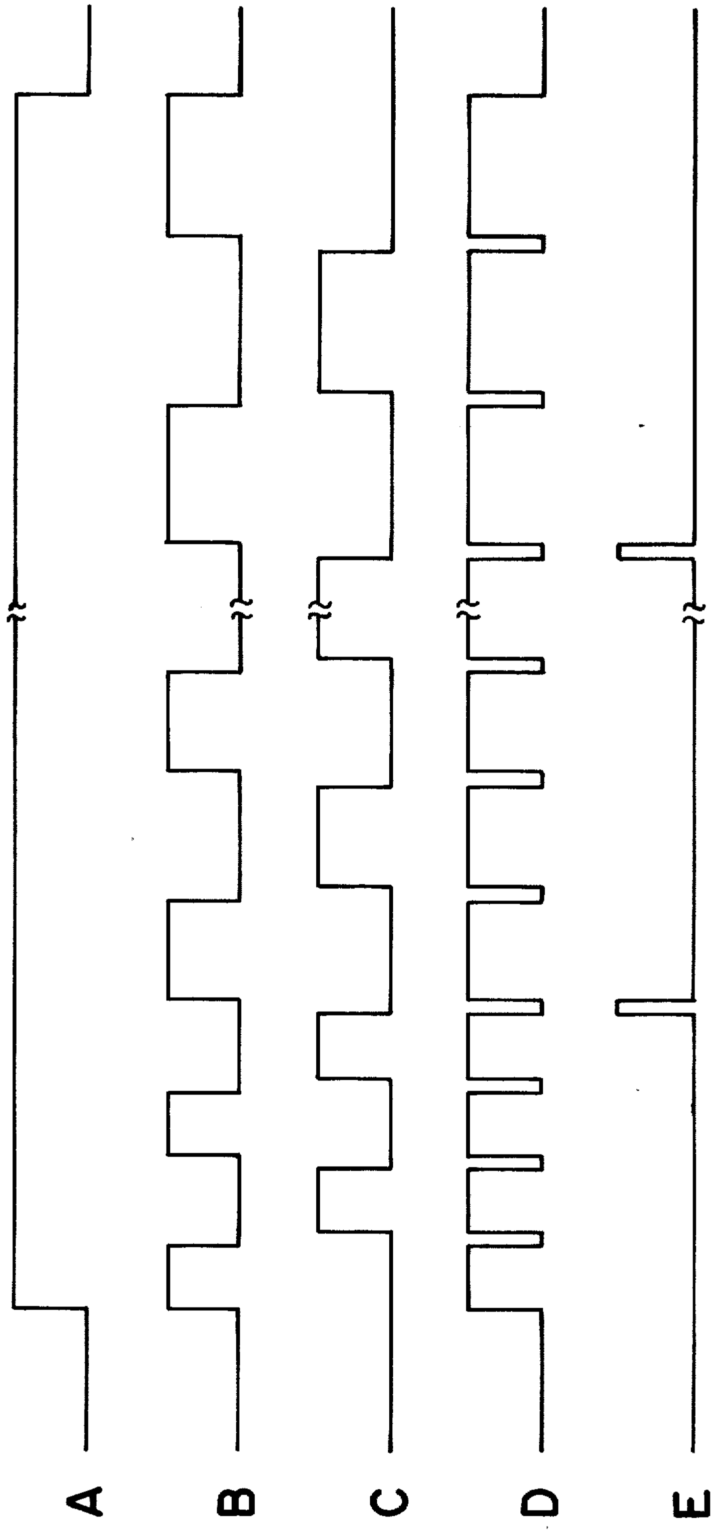
FIG. 2 illustrates a typical train of pulses appearing at designated points in the circuit of FIG. 1.

Referring to FIG. 1 in the drawing, monostable multivibrators 10 and 20 are provided, each having an input and an output. The output of each monostable multivibrator is connected to the input of the other and also to the inputs of an OR gate 15. Connected this way, the two monostable multivibrators combine to form an astable free-running multivibrator, generating at the output of OR gate 15 a train of pulses whose frequency is double the frequency of the output from each of the monostable multivibrators. The frequencies of the two monostable multivibrators is controlled by their respective R-C timing networks. A control input 22 is further provided to monostable multivibrator 20 to provide means for turning the frequency generator on or off.

The capacitive component of the R-C timing network associated with monostable multivibrator 10 is illustrated at 11 and the capacitive component of the R-C timing network associated with monostable multivibrator 20 is illustrated at 21. The resistive components of the two R-C timing networks are illustrated in the drawing with reference numerals 30, 31, and 32. The first end of resistors 30, 31, and 32 is connected to a source of positive potential. The second end of resistor 30 is connected to the anode of a diode 40, the second end of resistor 31 is connected to the anode of a diode 41, and the second end of resistor 32 is connected to the anode of a diode 42. The cathodes of diodes 40, 41, and 42 are connected to a common junction point 50. Junction point 50 is connected to capacitor 11 through a variable resistor 51 and to capacitor 21 through a variable resistor 52. Variable resistors 51 and 52 are trimmer potentiometers and are used to adjust the output pulses at B and C in the preferred embodiment to precisely the same pulse width. Adjustment of this type may be necessary to compensate for the tolerances in the circuit component values.

The second end of resistor 30 is further connected to the collector of a transistor 60 which functions as a switch and is operable to connect the second end of resistor 30 to a reference potential. Similar switching means, identified by numerals 61 and 62, are connected to the ends of resistors 31 and 32, respectively. Transistor switches 60 through 62 are controlled in such a way that the second ends of all except one of resistors 30 through 32 are grounded at any one time. Thus, effectively only the one resistor, whose second end is not grounded, is connected into the R-C timing networks of the two monostable multivibrators 10 and 20. The other resistors are disconnected through the reverse bias of the diodes associated with each resistor.

The base electrodes of transistor switches 60, 61, and 62 are connected to outputs of a demultiplexer 70 which is controlled through a demultiplexer control 71. The demultiplexer acts essentially as a steering mechanism.

The output of OR gate 15 is connected to input 81 of a modulo counter 80, which is adapted to provide a pulse at its output upon presentation of a predetermined number of pulses at its input 81. Modulo counter 80 further has a plurality of inputs 82 through which counter 80 can be present to vary the predetermined number of pulses required at input 81 to generate a pulse at output 82. The output of modulo counter 80 is connected to the input of the multiplexer control 71 and also to the input of a modulo control 85, which provides feedback to preset modulo counter 80, as will be explained further hereinafter.

The circuit described above will provide a train of high frequency digital pulses containing $N_1$ pulses at $f_a$, $N_2$ pulses at $f_b$, $N_3$ pulses at $f_c$, and $N_n$ pulses at $f_x$ according to the following equation:

$$\text{Pulse Train} = N_{1(f_a)} + N_{2(f_b)} + N_{3(f_c)} + \ldots + N_{n(f_x)}$$

The train of pulses is synced to a control signal applied at the control input of monostable multivibrator 20, and can be stopped by removing the control signal. The frequency of the pulses at the output 25 of OR gate 15 is $$f = \frac{2}{R\,(C_1 + C_2)\,\ln 2}$$

where R is either $R_A$, $R_B$, or $R_X$, corresponding in FIG. 1 to resistors 30, 31, or 32. With $R_A$ switched into the circuit, the output frequency is:

$$f_a = \frac{1}{R_A\,C\,\ln 2} \text{ with } C = C_1 = C_2,$$

corresponding in FIG. 1 to capacitors 11 and 21, while the frequency would be:

$$f_x = \frac{1}{R_X\,C\,\ln 2}$$

with $R_X$ switched into the circuit. The remainder of the circuitry provides the controls to count the number of pulses of each frequency and switch the proper resistors into the multivibrator.

As mentioned before, the width of the pulses generated by multivibrators 10 and 20 is determined by the value of the resistor switched into the timing networks of the multivibrators. The switching of the resistors is controlled through a feedback loop responsive to the number of pulses generated at output terminal 25 of OR gate 15. Modulo counter 80, which receives pulses from output terminal 25, is in the preferred embodiment a three-stage binary counter which normally will generate one output pulse for each eight pulses it receives at its input 81. Modulo counter 80, however, has the further capability that it can be preset through its binary inputs 82, such that an output pulse will be generated upon receiving a number less than eight pulses at its input 81. The function of presetting modulo counter 80 is accomplished through modulo control 85, which itself could be a counter with an input connected to receive pulses from the output of modulo counter 80 and a plurality of binary outputs connected to inputs 82 of modulo counter 80. Thus, modulo control 85 presets or preprograms modulo counter 80 so that an output will be generated for any integer number, e.g., $N_1$, $N_2$, $N_3$, etc., of input pulses. For example, modulo counter 80 might be preset to provide one output pulse for each eight input pulses. After generating a predetermined number of pulses, modulo control 85 might be adapted to preset modulo counter 80 to seven pulses, and so on, reducing the predetermined number in counter 80 by one in response to a second predetermined number of pulses at its output. In a broader sense, modulo counter 80 could be preset in response to external signals, which are not a function of the modulo counter output. Such variations will become obvious to those skilled in the art.

The pulses generated at the output of modulo counter 80 are used to control the operation of demultiplexer 70 through demultiplexer control 71. Demultiplexer 70 has n binary inputs and $2^n$ of outputs. In the embodiments shown, all of the outputs of demultiplexer 70 are normally at a positive potential, except one, which is dropped to the reference potential. Demultiplexer control 71 has a single input at which it receives the output pulses from modulo control 80, and has a plurality of binary outputs connected to the binary inputs of demultiplexer 70. Demultiplexer control 71, for example, could be a four-stage binary counter with four binary outputs, one from each stage. In such an arrangement, demultiplexer 70 would be capable of handling 16 switching functions.

As discussed earlier in the specification, a positive potential on an output of demultiplexer 70 closes the switch between the second end of the associated resistor and a reference ground terminal, thereby disconnecting the resistor from the timing network of the monostable multivibrators 10 and 20. Only the resistor associated with the one output of demultiplexer 70 which is at the reference or negative potential will be connected into the timing networks of the two multivibrators at any one time. Thus, the selection of the appropriate resistor to be connected into the timing network is determined by the binary signal applied to the input of demultiplexer 70, which in turn is responsive to the output of modulo counter 80.

While a preferred embodiment of the present invention was illustrated in the drawings and discussed above, it is clear that other embodiments of this invention may be devised by those skilled in the art, without deviating from the scope of the invention which is to be limited only by the following claims.

We claim:

1. A variable frequency pulse train generator comprising:

an astable free-running multivibrator including first and second monostable multivibrators, each adapted to provide an output pulse of predetermined width in response to application of a pulse at its respective inputs, said predetermined pulse width being a function of the parameters of the timing network associated with the monostable multivibrators;

a plurality of resistors, each of different value, each of said resistors having a first end connected to a source of potential and a second end connected through a diode to the timing networks of the two monostable multivibrators;

a plurality of switching means equal in number to the plurality of said resistors, each said switching means adapted to connect the second end of one of said resistors to a point of reference potential and each said switching means being operable through a control terminal to disconnect said second end of said resistor from said point of reference potential; and control means having an input and a plurality of outputs, one of said outputs being connected to the control terminal of each of said switching means to connect one of said resistors into the timing networks of the two monostable multivibrators upon application of a signal to the input of said control means.

2. Apparatus according to claim 1, wherein an OR gate is provided having a first input connected to the output of said first monostable multivibrator and a second input connected to the output of said second monostable multivibrator, said OR gate having an output; and a counter is connected to receive the signals from the output of said OR gate and adapted to provide a control signal to the input of said control means in response to a predetermined number of pulses.

3. Apparatus according to claim 2, wherein said control means consists of a demultiplexer having a plurality of binary inputs and a demultiplexer control having an input and a plurality of binary outputs connected directly to the inputs of said demultiplexer.

4. Apparatus according to claim 3, wherein said counter is a modulo counter having a signal input and an output at which a pulse is generated upon presentation of a predetermined number of pulses at its signal input.

5. Apparatus according to claim 4, wherein said modulo counter further has a control input for controlling the predetermined number of pulses required to produce an output.

6. Apparatus according to claim 5, wherein said modulo counter control means consists of a plurality of binary inputs for presetting the count in said modulo counter; and wherein a modulo control means having an input connected to the output of said modulo counter and having a plurality of binary outputs connected directly to said binary inputs of said modulo counter is further provided for progressively altering the predetermined number of pulses required at the signal input of said modulo counter to produce a pulse at its output.

* * * * *